Nov. 2, 1954   F. KOPPELMANN   2,693,576
MEASURING INSTRUMENT
Filed Feb. 1, 1950

INVENTOR.
Floris Koppelmann
BY
Michael S. Striker

United States Patent Office 2,693,576
Patented Nov. 2, 1954

2,693,576
MEASURING INSTRUMENT

Floris Koppelmann, Berlin-Reinickendorf, Germany, assignor to Allgemeine Elektricitats-Gesellschaft, a corporation Application February 1, 1950, Serial No. 141,638

Claims priority, application Germany July 16, 1949

8 Claims. (Cl. 324—119)

The present invention relates to a mechanical rectifier for use in combination with a D. C. galvanometer.

It is an object of the present invention to provide a mechanical rectifier enabling a direct measurement of the phase angle between a current and the voltage causing the current.

It is another object of the present invention to provide a mechanical rectifier which can be combined with a galvanometer in a single instrument in a casing having standard dimensions.

It is a further object of the present invention to provide a mechanical rectifier with a stationary contact piece and a movable contact piece which allows accurately to adjust the closing time of the contact pieces and their phase relation with respect to an alternating electrical quantity such as an A. C. voltage.

The invention comprises in its broadest aspects in combination a contact arrangement including a stationary contact piece and a movable contact piece, means for supplying an alternating electrical quantity to the contact pieces, a synchronous motor adapted to be fed with a current synchronous with the alternating quantity supplied to the contact pieces and driving the movable contact piece so as to periodically make and break the contact between the contact pieces, means for adjusting the portion of the cycle of the alternating quantity during which the contact pieces are making contact with each other, means for adjusting the phase angle between the alternating quantity supplied to the contact pieces and the time at which the contact between said contact pieces is established, and means for rotating the contact arrangement as a whole through an angle of not more than 180°.

In a preferred embodiment of the present invention a crank is provided having a pin adapted to move the movable contact piece and a synchronous motor drives the crank, thereby periodically making and breaking the contact between the contact pieces.

In a preferred embodiment of the present invention the synchronous motor comprises a stator and a rotor driving the crank, and means are provided for rotating the stator with respect to the rotor, thereby adjusting the phase angle between the alternating quantity supplied to the contact pieces and the time at which the contact between the contact pieces is established.

Preferably the position of the stationary contact piece is adjustable in order to adjust the portion of the period of the alternating quantity during which the contact pieces are making contact with each other.

In a preferred embodiment of the present invention a stationary contact piece and a movable contact piece are arranged in a member which is rigidly connected to a tube-like member enclosing the shaft of the synchronous motor.

A measuring instrument according to the present invention comprises in combination, a casing preferably of the size of a normal precision instrument casing, a moving coil galvanometer in the casing preferably fitted with a series resistance and shunt resistance for voltage and current measurements, respectively, and a mechanical rectifier of the type described, the member enclosing the contact arrangement of the rectifier being arranged on the casing of the instrument for rotation through an angle of not more than 180°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
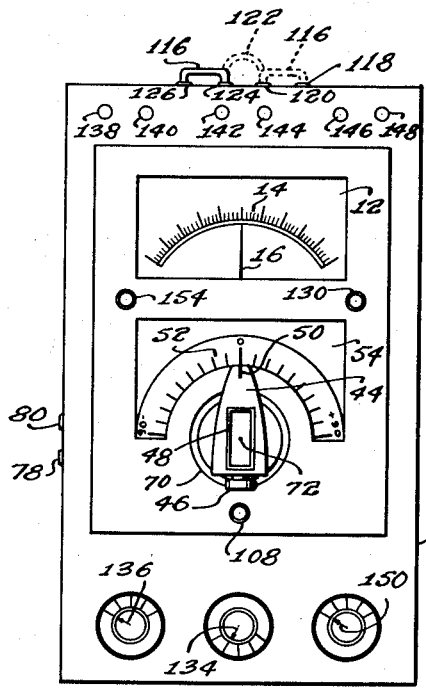
Fig. 1 is a plan view of a measuring instrument according to the present invention.
Figure 4:
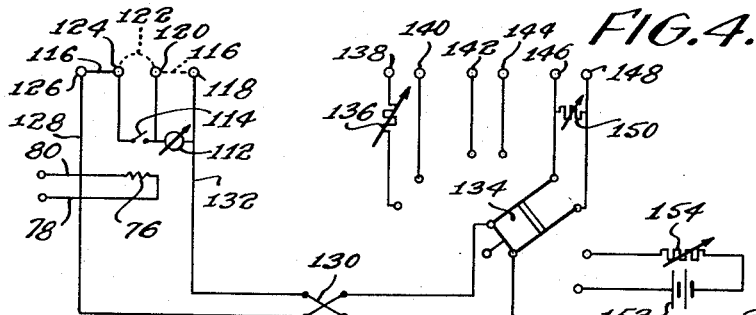
Fig. 4 is a wiring diagram of the instrument shown in Fig. 1.

Referring now to the drawings and first to Figure 1, a casing 10 preferably having the size of a normal precision instrument casing is on its top face provided with a window 12 for a moving coil galvanometer indicated at 112 in Fig. 4 and of which only the scale 14 and the pointer 16 are visible in Fig. 1. Furthermore a mechanical rectifier to be described hereinafter more in detail is arranged partly within and partly outside of the casing 10.

Figure 2:
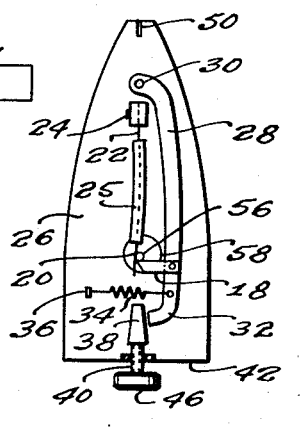
Fig. 2 is an enlarged plan view of a detail of the instrument shown in Fig. 1.
Figure 3:
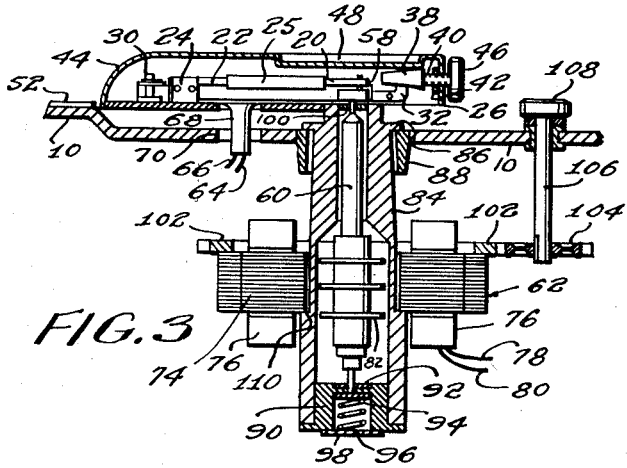
Fig. 3 is a vertical section through the parts shown in Fig. 2 and the neighboring parts shown in Fig. 1.

Referring now to Figs. 1 to 3, it will be seen that the mechanical rectifier comprises a stationary contact piece 18 and a movable contact piece 20. The movable contact piece 20 is provided at one end of a leaf spring 22 held with its other end in a bearing member 24. A rubber sleeve 25 encloses the main portion of the leaf spring 22 and serves as a dampening means. The leaf spring 22 preferably consists of a steel band having a thickness of a few tenths of a millimeter and a uniform width of 2 mm. The contact making surfaces of the contact pieces 18, 20 are made from a precious metal such as gold in order to keep the contact resistance as low as possible, for instance in the order of magnitude of $1/100$ ohm. The bearing member 24 is arranged on a base plate 26 carrying the whole contact arrangement, indicated by 114 in Fig. 4.

The stationary contact piece 18 is carried by an arm 28 pivoted at 30 to the base plate 26 and having an extension 32 which is under the action of a helical spring 34 attached at 36 to the base member 26 and urging the stationary contact piece 18 towards the movable contact piece 20. This motion is limited by a conical member 38 against which the bent-off portion of the extension 32 abuts. The conical member 38 is rigidly connected to a shaft 40 screwed into the rear wall 42 of a hollow member 44 enclosing the contact arrangement 114 and carrying the base plate 26. Shaft 40 is connected to a knob 46 for adjusting the conical member 38 and thereby limiting the distance through which the spring 34 can pull the stationary contact piece 18 towards the movable contact piece 20.

Member 44 is provided on its upper wall with a window 48 through which the contact pieces 18 and 20 can be observed. The member 44 is shaped as shown in Figs. 1–3 and arranged for rotation on the casing 10 in a manner to be described hereinafter. The member 44 carries a mark 50 on its tip which cooperates with a scale 52 provided on the top face of the casing 10 and protected by a window 54.

The movable contact piece 20 is acted upon by a crank arrangement including a pin 56 (Fig. 2) which is rigidly connected to a crank disc 58 in an eccentric position. The pin 56 is made from hardened steel and the leaf spring 22 is provided with a silver covering at the spot where it comes into contact with the pin 56. The crank disc 58 is driven by the shaft 60 of a synchronous motor generally indicated by 62 (Fig. 3). During the rotation of the crank disc 58 contact piece 20 is pushed out of contact with the stationary contact piece 18 for a part of the full rotation of the disc 58 the length of which depends on the position of the stationary contact piece 18 which can be adjusted by turning the knob 46 as described hereabove.

Current leads 64 and 66 (Fig. 3) lead the current, respectively, to the pivot 30 of the lever 28 carrying the stationary contact piece 18, and the bearing member 24 carrying the leaf spring 22 carrying the movable contact piece 20. The leads 64 and 66 enter the member 44 from below through a piece of tubing 68 connected to the base plate 26 of the member and moving in a slot 70 of the casing 10 when the member 44 is rotated.

The shaft 60 of the synchronous motor 62 is arranged with its upper end at the center of rotation 72 of the member 44 and the crank disc 58 (Figs. 1 and 3). The member 44 and the contact arrangement 114 can be rotated about the center 72 through an angle of 180° consisting of 90° to either side of the mid position indicated in Fig. 1 by the mark 0. The mark 50 may be provided with a notch cooperating with a rest provided at the position 0. Similar rests may be provided at the positions −90° and +90°. The mark 50 in cooperation with the scale 52 allows to read the angular displacement of the member 44.

The synchronous motor 62 comprises a stator 74 carrying exciting windings 76 to which a one-phase current is supplied by leads 78 and 80 (Fig. 3). The stator 74 of the motor surrounds the rotor 82 connected to the shaft 60. A tube-like member 84 preferably consisting of brass fills the air gap between the stator 74 and the rotor 82 and encloses the shaft 60. The tube-like member 84 is at its upper end rigidly connected to the base plate 26 and the member 44. Member 84 is provided at its upper end portion with a flange 86 which abuts annular member 88 of casing 10. The lower, narrow end portion of shaft 60 is centered by means of bush bearing 92. The end of the shaft passes through an aperture in the center of stopper 90 and bears against thrust bearing 94. Thrust bearing 94 is acted upon by a helical spring 96 the lower end of which abuts against a plate 98 connected to the stopper 90 by screwing or welding. The upper end of the shaft 60 which is connected to the crank disc 58 passes through a bush bearing 100. The bush bearings 92 and 100 are preferably made from pure silver whereas the thrust bearing 94 on which the bevelled lower end of the shaft 60 rotates, preferably consists of a precious stone or glass. In this way it is accomplished that the ends of the shaft 60 are supported by the bearings with very low friction and with little play.

The stator 74 of the synchronous motor 62 is provided, preferably on the perimeter of its upper end face, with a toothed rim 102 engaged by a pinion 104 rigidly secured to a shaft 106 adjustable by a knob 108 (Figs. 1 and 3) and rotatably arranged in the casing 10 parallel to the shaft 60. By means of the knob 108 the stator 74 can be given any angular displacement with respect to the axis of the rotor 82 and the shaft 60.

The synchronous motor 62 should rotate the rotor with a constant angular velocity so that no angular deviations occur in the device according to the invention. The rotor should be rigidly connected to the crank disc 58 and the pin 56 by means of the shaft 60 so that variations of the driving voltage or the like do not affect the accuracy of the measurement. The exciting field of the motor should be screened by suitable means (not shown) so that no appreciable voltages are induced in the measuring circuit, these voltages preferably not exceeding $10^{-6}$ volts. The driving voltage should be one-phased and the input of the motor as small as possible. If desired a rotary field can be provided by an auxiliary voltage in which the rotor operates either by hysteresis in case it is made of steel or as a synchronous short circuited armature provided with a damping winding.

It will be understood that the bearings of the shaft 60 rotate together with the member 44 and that the stator 74 is rotatably arranged with respect to the tubular member 84 and ress on an outwardly extending supporting portion 110 thereof.

Referring now to the diagram shown in Fig. 4 it will be seen that the moving coil galvanometer 112 is connected in series with the contact arrangement 114 including the contact pieces 18 and 20. The moving coil galvanometer 112 can be short circuited by a short circuiting member 116 connected to the terminals 118 and 120 whereas the contact arrangement 114 can be short circuited by a short circuiting member 122 connected to the current terminal 120 of the galvanometer 112 and the contact arrangement 114 and the terminal 124.

As a rule the galvanometer 112 and 114 are not short circuited and the short circuiting member 116 connects the terminal 124 to a terminal 126 and a wire 128 leading to one side of a change over switch 130 connected by a wire 132 to the moving coil galvanometer 112.

Parts 116 to 126 are also shown in Fig. 1. The change over switch 130 connects the wires 128 and 132 to a double pole switch 134 which has four different operating positions of which the third position is shown in Fig. 4. In the first position the switch 134 is connected over an adjustable series resistance 136 arranged in the casing 10 (see Fig. 1) to a pair of terminals 138, 140 (see also Fig. 1). In the second position the switch 134 is connected to terminals 142 and 144 which serve for connecting external series or shunt resistances (not shown) to the galvanometer 112. In the third position which is shown in the drawing, the two-pole switch 134 is connected to terminals 146 and 148 to which an adjustable shunt resistance 150 arranged in the casing 10 (see Fig. 1) is connected in parallel. The third position serves for measuring a current by the galvanometer 112. In the fourth position the switch 134 connects the galvanometer to a battery 152 and an adjustable series resistance 154. These serve for controlling the time of contact engagement of contact pieces 18 and 20 and are used by short circuiting the contact arrangement 114 by the short circuiting member 122 and adjusting resistance 154 so that the galvanometer 112 shows a full deflection of its pointer 16. Then the short circuiting member 122 is removed so that the deflection of the galvanometer is reduced to a fraction of a full deflection corresponding to the fraction of a full cycle which the closing time of the contact arrangement 114 occupies.

Fig. 4 shows also the winding 76 of the synchronous motor 62 with its leads 78 and 80 to which a current synchronous with the quantity to be measured is applied. If the instrument is to be used without the moving coil galvanometer in connection with an external galvanometer, for instance of the mirror type, the short circuiting member 116 is transferred from the position shown in full lines in Fig. 4 to the position shown in dotted lines in which it short circuits the moving coil galvanometer 112.

Figure 5:
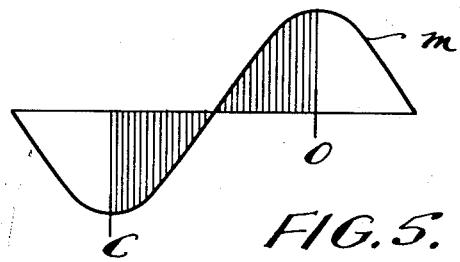
Figs. 5 and 6 are diagrams for explaining the operation of the instrument according to the invention.
Figure 6:
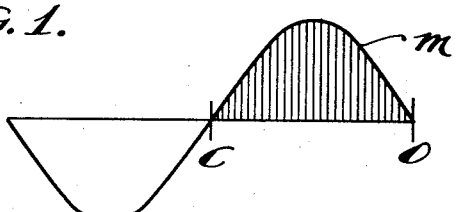

The operation of the device will now be explained in connection with the moving coil galvanometer 112. The synchronous motor 62 is started with a driving voltage synchronous to the quantity to be measured. If the quantity being measured is a voltage, switch 134 is switched to the first operative position in which it makes connection with terminals 138 and 140 to which the voltage to be measured is applied. Member 44 is brought to the mid position marked 0 on the scale 52. In this position the pointer 16 of the galvanometer 112 shows a deflection to the right or to the left from its mid position according to the phase difference of the voltage with respect to the synchronous voltage driving the motor. By means of the knob 108 the stator 74 of the synchronous motor 62 is rotated so that the pointer 16 moves once more into its mid position. The position of the phase of the voltage to be measured with respect to the closing and opening time of the contact arrangement which must be satisfied in this condition is shown in Fig. 5 in which the curve $m$ represents the quantity to be measured, in this case, the voltage applied to the terminals 138 and 140. The voltage has its crest of the negative half wave coinciding with the closing time C of the contact arrangement 114 and the crest of the positive half wave coinciding with the opening time O of the contact arrangement. Now the contact arrangement 114 is rotated through 90° by rotating the member 44 to the position in which the mark 50 coincides with +90° on the dial 52. This rotation causes a relative position of the curve $m$ with respect to the changing and opening times C and O of the contact arrangement shown in Fig. 6, where the positive half wave of the curve $m$ coincides with the time between C and O. Therefore the galvanometer 112 will now show a deflection corresponding to half the arithmetical mean value of the positive half wave of the curve $m$.

In a similar way the instrument may be used for a current measurement, the switch 134 being brought into its third position connecting the galvanometer 112 and the contact arrangement 114 to terminals 146 and 148.

The instrument may also be used for directly indicating the phase angle between a current and a voltage. In order to accomplish this, switch 134 is first brought into the first position connecting terminals 138 and 140 to the galvanometer 112 and the contact arrangement 114, and the stator 74 is rotated by the knob 108 into a position in which the pointer 16 of the galvanometer 112 shows no deflection while the member 44 is in its mid position. Then the switch 134 is switched into the third position in which it connects the current terminals 146 and 148 to the galvanometer 112 and the contact arrangement 114. The pointer 16 of the galvanometer 112 will now show a deflection which is made to disappear by a rotation of the member 44 without actuating the knob 108. The phase angle may then be read from the position of the mark 50 on the scale 52. This phase difference is leading if member 44 has to be rotated to the right and lagging if it has to be rotated to the left.

It should be understood that by means of the knob 46 the contact time of the contact arrangement can be adjusted to any value up to 180° or a half cycle, and this adjustment can be checked by bringing the switch 134 into its fourth position where it is connected to the battery 152 and the series resistance 154. This check can be made at any time even during a series of correlated measurements in order to compensate any change of the contacting time due to mechanical or electrical loads which could lead to errors in measurement.

The purpose of the change over switch 130 is to change the sign of the deflections of pointer 16 without rotating member 44 and the contact arrangement 114. For instance, if the deflection of the pointer 16 is negative it can be made positive by simply switching over the change over switch 130.

With the instrument described hereinabove voltages and currents can be measured which have very small values. Furthermore phase angles may be directly measured. Watt components and wattless components of currents may also be measured as will be evident to anyone skilled in the art. Further it is possible by means of inductive or capacitive series and shunt resistances to obtain a record of the time curve of the quantity to be measured. If the quantity to be measured is not a simple sine wave, the fundamental wave and the harmonics can be ascertained.

It will be understood that each of the elements described above, or two or more together, may also find a useful application in other types of mechanical rectifiers differing from the types described above.

While I have illustrated and described the invention as embodied in a mechanical rectifier for use in connection with a moving coil galvanometer, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A galvanometer arrangement, comprising, in combination, electric indicator means adapted to indicate the value of an electric direct current; an electric circuit including said electric indicator means and adapted to be connected to a source of alternating current to be measured; movable contact means in said circuit for closing and opening the same; operating means for periodically opening and closing said movable contact means once during each cycle of the alternating electric current to be measured so that said contact means is in closed position for substantially one half of each cycle and in open position during the remainder of said cycle; first adjusting means for adjusting said operating means so that the closing period of each cycle during which said contact means is in closed position is centered exactly about the mid zero point of each cycle; and second adjusting means for adjusting said movable contact means, whenever required, so as to shift the closing periods of said movable contact means from its centered position about mid zero point of each cycle by a quarter of a cycle in either direction, and means for adjusting the contact time of said movable contact means so as to compensate for changes in contact time resulting from changes in mechanical or electrical loads.

2. A galvanometer arrangement comprising, in combination, electric indicator means adapted to indicate the value of an electric direct current; an electric circuit including said electric indicator means and adapted to be connected to a source of alternating current to be measured; movable contact means in said circuit for closing and opening the same; operating means for periodically opening and closing said movable contact means once during each cycle of the alternating electric current to be measured so that said contact means is in closed position for substantially one-half of each cycle and in open position during the remainder of said cycle; first adjusting means for adjusting said operating means so that the closing period of each cycle during which said contact means is in closed position is centered exactly about the mid zero point of each cycle; second adjusting means for adjusting said movable contact means, whenever required, so as to shift the closing periods of said movable contact means from its centered position about mid zero point of each cycle by a quarter of a cycle in either direction; means for adjusting the contact time of said movable contact means so as to compensate for changes in contact time resulting from changes in mechanical or electrical loads; and means for checking the contact time to ascertain whether the contact time has changed.

3. An instrument for carrying out precision measurements of an alternating electrical quantity comprising, in combination, a rotatable contact arrangement having fixed and movable contact means, said rotatable contact arrangement having a center of rotation; a switch having a plurality of contacts adapted to be connected to the alternating electrical quantity to be measured, said switch selectively connecting said plurality of contacts to said rotatable contact arrangement thereby feeding the alternating electrical quantity to be measured thereto; means for periodically opening and closing said fixed and movable contact means of said contact arrangement; means actuated by an alternating voltage having the same frequency as the alternating electrical quantity to be measured and driving said periodically contact opening and closing means; means for compensating any phase difference between the alternating voltage actuating said means and the alternating electrical quantity to be measured; a movable coil galvanometer connected to one of said contacts of said contact arrangement so as to be connected to the quantity to be measured when said contacts are closed; and means for rotating said rotatable contact arrangement about said center of rotation thereof to either side through an angle not exceeding 90° whereby the phase position of the closing of said contact is adjusted by a value not exceeding a quarter of a cycle of said alternating quantity to be measured with respect to said alternating voltage actuating said driving means; and means for adjusting the contact time of said fixed and movable contact means so as to compensate for changes in contact time resulting from changes in mechanical or electrical loads.

4. An instrument for carrying out precision measurements of an alternating electrical quantity comprising, in combination, a rotatable contact arrangement having fixed and movable contact means, said rotatable contact arrangement having a center of rotation; a switch having a plurality of contacts adapted to be connected to the alternating electrical quantity to be measured, said switch selectively connecting said plurality of contacts to said rotatable contact arrangement thereby feeding the alternating electrical quantity to be measured thereto; means for periodically opening and closing said contacts of said contact arrangement; means actuated by an alternating voltage having the same frequency as the alternating electrical quantity to be measured and driving said contact opening and closing means; means for compensating any phase difference between the alternating voltage actuating said means driving said opening and closing means and the alternating electrical quantity to be measured; a movable coil galvanometer connected to one of said contact means of said contact arrangement so as to be connected to the quantity to be measured when said contacts are closed; means for rotating said rotatable contact arrangement about said center of rotation thereof to either side through an angle up to 90° whereby the phase position of the closing of said contact is adjusted by a value up to a quarter of a cycle of said alternating quantity to be measured with respect to said alternating voltage actuating said driving means; and means for adjusting the contact time of said rotatable contact arrangement to compensate for changes in contact time reulting from changes in mechanical or electrical loads.

5. A galvanometer arrangement, comprising, in combination, electric indicator means adapted to indicate the value of an electric direct current; an electric circuit including said electric indicator means and adapted to be connected to a source of alternating current to be measured; a rotatable contact arrangement having fixed and movable contact spring means and arranged in said circuit for closing and opening the same; means for periodically moving said movable contact means into and out of engagement with said fixed contact means; a synchronous motor fed by the source of alternating current, said synchronous motor driving said means for periodically opening and closing said rotatable contact arrangement once during each cycle of the alternating electric current to be measured so that said rotatable contact arrangement is in closed position for substantially one-half of each cycle and in open position during the remainder of said cycle; first adjusting means for adjusting said synchronous motor so that the closing period of each cycle during which said rotatable contact arrangement is in closed position is centered exactly about the mid zero point of each cycle; and second adjusting means for adjusting said rotatable contact arrangement, whenever required, so as to shift the closing periods of said rotatable contact arrangement from its centered position about mid zero point of each cycle by a quarter of a cycle in either direction.

6. A galvanometer arrangement, comprising, in combination, electric indicator means adapted to indicate the value of an electric direct current; an electric circuit including said electric indicator means and adapted to be connected to a source of alternating current to be measured; a rotatable contact arrangement having fixed and movable contact means and arranged in said circuit for closing and opening the same; means for periodically moving said movable contact means into and out of engagement with said fixed contact means; a synchronous motor having a stator and a rotor, said synchronous motor being fed by the source of alternating current, said rotor of said synchronous motor driving said means for periodically opening and closing said rotatable contact arrangement once during each cycle of the alternating electric current to be measured so that said rotatable contact arrangement is in closed position for substantially one-half of each cycle and in open position during the remainder of said cycle; first adjusting means for adjusting said stator so as to center exactly about the mid zero point of each cycle the closing period of each cycle during which said rotatable contact arrangement is in closed position; and second adjusting means for adjusting said rotatable contact arrangement, whenever required, so as to shift the closing periods of said rotatable contact arrangement from its centered position about mid zero point of each cycle by a quarter of a cycle in either direction.

7. An instrument for carrying out precision measurements of an alternating electrical quantity comprising, in combination, a rotatable contact arrangement having fixed and movable contact means, said rotatable contact arrangement having a center of rotation; a switch having a plurality of contacts adapted to be connected to the alternating electrical quantity to be measured, said switch selectively connecting said plurality of contacts to one of said contact means of said rotatable contact arrangement thereby feeding the alternating electrical quantity to be measured thereto; means for periodically moving said movable contact means into and out of engagement with said fixed contact means; a synchronous motor actuated by an alternating voltage having the same frequency as the alternating electrical quantity to be measured and driving said contact opening and closing means; means for compensating any phase difference between the alternating voltage actuating said synchronous motor and the alternating electrical quantity to be measured; a movable coil galvanometer connected to one of said contact of said contact arrangement so as to be connected to the quantity to be measured when said contacts are closed; and means for rotating said rotatable contact arrangement about said center of rotation thereof to either side through an angle up to 90° whereby the phase position of the closing of said contact is adjusted by a value up to a quarter of a cycle of said alternating quantity to be measured with respect to said alternating voltage actuating said driving means.

8. An instrument for carrying out precision measurements of an alternating electrical quantity comprising, in combination, a rotatable contact arrangement having fixed and movable contact means, said rotatable contact arrangement having a center of rotation; a switch having a plurality of contacts adapted to be connected to the alternating electrical quantity to be measured, said switch selectively connecting said plurality of contacts to said rotatable contact arrangement thereby feeding the alternating electrical quantity to be measured thereto; means for periodically moving said movable contact means into and out of engagement with said fixed contact means; a synchronous motor having a stator and a rotor, said synchronous motor being actuated by an alternating voltage having the same frequency as the alternating electrical quantity to be measured and driving said means for periodically opening and closing said contact means; means for rotating said stator with respect to said rotor so as to compensate for any phase difference between said alternating voltage actuating said synchronous motor and the alternating electrical quantity to be measured; a movable coil galvanometer connected to one of said contact means of said contact arrangement so as to be connected to the quantity to be measured when said contacts are closed; and means for rotating said rotatable contact arrangement about said center of rotation thereof to either side through an angle not exceeding 90° whereby the phase position of the closing of said contact is adjusted by a value not exceeding a quarter of a cycle of said alternating quantity to be measured with respect to said alternating voltage actuating said driving means.

References Cited in the file of this patent

UNITED STATES PATENTS

| Number | Name | Date |
|---|---|---|
| 1,143,175 | Cottrell | June 15, 1915 |
| 1,253,212 | Chubb | Jan. 15, 1918 |
| 1,281,673 | Seely | Oct. 15, 1918 |
| 1,591,186 | Russell | July 6, 1926 |
| 1,963,551 | Gunn | June 19, 1934 |
| 2,227,937 | Koppelmann | Jan. 7, 1941 |
| 2,551,291 | Rich | May 1, 1951 |

FOREIGN PATENTS

| Number | Country | Date |
|---|---|---|
| 383,921 | Germany | June 21, 1917 |